(12) United States Patent
Awad et al.

(10) Patent No.: US 12,698,224 B2
(45) Date of Patent: Aug. 4, 2026

(54) SYNTHESIS OF NANOPHOTOCATALYST FOR SEWAGE WATER TREATMENT

(71) Applicant: KING SAUD UNIVERSITY, Riyadh (SA)

(72) Inventors: Manal Ahmed Awad, Riyadh (SA); Hanan Fahad AlHarbi, Riyadh (SA); Khalid Mustafa Ortashi, Riyadh (SA); Latifah Abdullrahman AlHumaid, Riyadh (SA); Abdullah Anwar Ibrahim, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 2 days.

(21) Appl. No.: 18/983,121

(22) Filed: Dec. 16, 2024

(65) Prior Publication Data

US 2026/0167538 A1 Jun. 18, 2026

(51) Int. Cl.
| | |
|---|---|
| *C02F 1/72* | (2023.01) |
| *B01J 23/06* | (2006.01) |
| *B01J 35/39* | (2024.01) |
| *B01J 37/00* | (2006.01) |
| *B01J 37/03* | (2006.01) |
| *B01J 37/08* | (2006.01) |
| *C02F 1/32* | (2023.01) |
| *B82Y 30/00* | (2011.01) |

(Continued)

(52) U.S. Cl.
CPC .............. *C02F 1/725* (2013.01); *B01J 23/06* (2013.01); *B01J 35/39* (2024.01); *B01J 37/009* (2013.01); *B01J 37/038* (2013.01); *B01J 37/082* (2013.01); *C02F 1/32* (2013.01); *B01J 2235/15* (2024.01); *B01J 2235/30*

(2024.01); *B82Y 30/00* (2013.01); *B82Y 40/00* (2013.01); *C02F 2101/308* (2013.01); *C02F 2305/10* (2013.01)

(58) Field of Classification Search
CPC ...... C02F 1/72; C02F 1/32; C02F 1/46; C02F 1/78; C02F 1/70; C02F 1/725; C02F 2101/308; C02F 2305/10; B01J 23/06; B01J 23/14; B01J 35/39; B01J 37/009; B01J 37/038; B01J 37/082; B01J 2235/30; B01J 2235/15; B82Y 30/00; B82Y 40/00
USPC ..................................................... 210/748.14
See application file for complete search history.

(56) References Cited

U.S. PATENT DOCUMENTS

| | | | |
|---|---|---|---|
| 8,252,256 B2 | 8/2012 | Bagabas et al. | |
| 8,362,094 B1 * | 1/2013 | Bagabas ................ | B01J 37/031 |
| | | | 210/748.14 |
| 2010/0294728 A1 * | 11/2010 | Asgharnejad ........... | C02F 1/725 |
| | | | 502/343 |

OTHER PUBLICATIONS

A novel bio-fabrication of ZnO nanoparticles using cow urine and study of their photocatalytic, antibacterial and antioxidant activities (Year: 2021).*

(Continued)

*Primary Examiner* — Bobby Ramdhanie
(74) *Attorney, Agent, or Firm* — Nath, Goldberg & Meyer; Joshua B. Goldberg

(57) ABSTRACT

A method of synthesizing a ZnO nano-photocatalyst is provided, including providing an aqueous extract comprising pigeon droppings, filtering the aqueous extract to produce a filtrate, precipitating a solution of zinc nitrate with the filtrate to obtain a paste, and calcining the paste to obtain ZnO nanoparticles, wherein the ZnO nanoparticles are suitable for use as a nano-photocatalyst in sewage water treatment applications.

12 Claims, 10 Drawing Sheets

(51) Int. Cl.
    *B82Y 40/00*          (2011.01)
    *C02F 101/30*         (2006.01)

(56)                References Cited

OTHER PUBLICATIONS

Synthesis and applications of nanoâsized zinc oxide in wastewater treatment: a review (Year: 2021).*

ZnO Nanoparticles from Different Precursors and Their Photocatalytic Potential for Biomedical Use (Year: 2022).*

Microbial synthesis of zinc oxide nanoparticles and their potential application as an antimicrobial agent and a feed supplement in animal industry: a review (Year: 2019).*

Sultana, Kazi Afroza, et al. "Sustainable synthesis of zinc oxide nanoparticles for photocatalytic degradation of organic pollutant and generation of hydroxyl radical." Journal of Molecular Liquids 307 (2020): 112931.

Karthigaimuthu, D., et al. "Redox-active pigeon excreta mediated metal oxides nanosheets for enhancing co-catalyst for photovoltaic performance in dye-sensitized solar cells." Journal of Materials Research and Technology 27 (2023): 4440-4451.

* cited by examiner

SYNTHESIS OF NANOPHOTOCATALYST FOR SEWAGE WATER TREATMENT

FIELD AND BACKGROUND OF THE INVENTION

The disclosure of the present patent application relates to methods of synthesizing photocatalysts and particularly to a method of synthesizing a ZnO nano-photocatalyst.

DESCRIPTION OF THE PRIOR ART

Photocatalysis is a green method owing to its non-energy intensive and low temperature method for degradation and mineralization of pollutants. The method acts based on the illumination of semiconductors such as TiO2 and ZnO, which can be induced to the electron-hole pairs by photons with a proper energy level. The photogenerated electrons react with the pollutants and degrade them; meanwhile, the photogenerated holes react with the water to produce hydroxyl radicals on the semiconductor's surface. The attack of hydroxyl radicals on the pollutant compounds leads to their degradation and mineralization. Generally, the semiconductor for photocatalysis should be chemical or biological, inert, stable, inexpensive, easy to synthesize, and produced without human or environmental risks. Nanotechnology offers a lot of promise in the water purification area due to the large surface to volume ratios offered. Nanotechnology-enabled wastewater treatment promises to not only overcome major challenges faced by existing treatment technologies, but also to provide new treatment capabilities that could allow economic utilization of unconventional water sources to expand the water supply.

Recently, zinc oxide (ZnO) has attracted much attention within the scientific community as a 'future material'. ZnO has been widely studied since 1935, with much of our current industry and day-to-day lives critically reliant upon this compound. The renewed interest in this material has arisen out of the development of growth technologies for the fabrication of high-quality single crystals and epitaxial layers, allowing for the realization of ZnO based electronic and optoelectronic devices.

Common methods of synthesizing zinc oxide nanoparticles rely upon the use of chemical synthesis, such as reacting zinc nitrate hexahydrate and cyclohexylamine in an aqueous or ethanolic medium (See U.S. Pat. No. 8,252,256 B2). Alternative approaches include combusting a mixture of porous sawdust and zinc nitrate hexahydrate in a tube furnace (Sultana et al., 2020). However, a green, inexpensive, and efficient method of producing ZnO nanoparticles suitable for photocatalysis and sewage water treatment remains elusive.

Thus, a green method of synthesizing a nano-photocatalyst for sewage water treatment solving the aforementioned problems is desired.

SUMMARY OF THE INVENTION

The method of synthesizing a ZnO nano-photocatalyst includes providing an aqueous extract comprising pigeon excrement, filtering the aqueous extract to produce a filtrate, precipitating a solution of zinc nitrate with the filtrate to obtain a paste, and calcining the paste to obtain ZnO nanoparticles, wherein the ZnO nanoparticles are suitable for use as a nano-photocatalyst in sewage water treatment applications.

In a further embodiment, a method of treating sewage is provided including providing an aqueous extract comprising pigeon droppings, filtering the aqueous extract to produce a filtrate, precipitating a solution of zinc nitrate with the filtrate to obtain a paste, calcining the paste to obtain ZnO nanoparticles, and applying the ZnO nanoparticles to the sewage.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
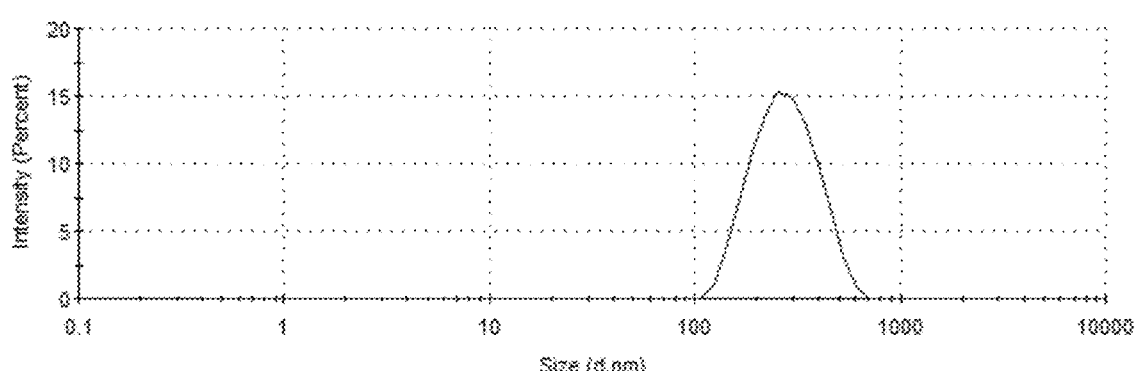
FIG. 1 is a graph depicting dynamic light scattering results for the ZnO nano-photocatalyst.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The method of synthesizing a ZnO nano-photocatalyst includes providing an aqueous extract comprising pigeon droppings, filtering the aqueous extract to produce a filtrate, precipitating a solution of zinc nitrate with the filtrate to obtain a paste, and calcining the paste to obtain ZnO nanoparticles, wherein the ZnO nanoparticles are suitable for use as a nano-photocatalyst in sewage water treatment applications.

In an embodiment, the filtering step may include filtering the aqueous extract through gauze to produce a first filtrate and filtering the first filtrate through Whatmann™ No. 1 filter paper to produce a second filtrate.

In an embodiment, the aqueous extract may be provided by suspending about 20 g of pigeon droppings in about 100 ml of water to produce the pigeon droppings aqueous extract.

In an embodiment, about 2 g of zinc nitrate hexahydrate may be mixed with about 100 ml of filtrate to obtain the paste. In a further embodiment, the mixing of the zinc nitrate hexahydrate and the filtrate may occur under constant stirring at about 60° C.

In an embodiment, the calcining may be conducted in a muffle furnace at about 400° C. for about 4 hours to produce a white powder comprising the ZnO nanoparticles.

In a further embodiment, a method of treating sewage is provided including providing an aqueous extract comprising pigeon droppings, filtering the aqueous extract to produce a filtrate, precipitating a solution of zinc nitrate with the filtrate to obtain a paste, calcining the paste to obtain ZnO nanoparticles, and applying the ZnO nanoparticles to the sewage.

Example 1

Synthesis of the Nano-Photocatalyst 20 g of pigeon droppings were suspended in about 100 mL of distilled water to produce a pigeon droppings aqueous extract. The pigeon droppings aqueous extract was then filtered through gauze to produce a first filtrate, and the first filtrate was then filtered through Whatmann™ No. 1 filter paper to produce a second filtrate.

Zinc oxide nanoparticles (ZnONPs) were synthesized by the precipitation method. Three (3) grams of zinc nitrate hexahydrate ($Zn(NO_3)_2 \cdot 6H_2O$ and 100 mL of filtered pigeon droppings aqueous extract (the second filtrate produced by the method discussed above) were mixed together under stirring at 60° C. to obtain a beige, brown paste solution. The paste solution was heated in an oven at 80° C. for 24 hours. The obtained dried paste was pounded into powder form and calcined in a muffle furnace at 400° C. for 4 hours to produce a white powder comprising ZnO nanoparticles (the Nano-Photocatalyst).

Example 2

Analysis of the Nano-Photocatalyst

ZnO nanoparticles produced by the method of Example 1 were characterized using various devices to confirm the production of ZnO nanoparticles and determine the specific characteristics of the resulting ZnO nanoparticles.

Dynamic light scattering (DLS) is a useful technique to evaluate the size distribution and particle size of nanoparticles. The results of the particle size distribution dynamic light scattering method confirmed the presence of zinc oxide NPs having a particle Z-Average size of 337.3 nm and Poly dispersity index of 0.400. Further DLS results may be found in FIG. 1 and Table 1. These findings also ascertained the monodispersed zinc oxide nanoparticles have a very broad size distribution as indicated by the polydispersity index value>0.7.

TABLE 1

Dynamic Light Scattering of Nano-Photocatalyst

|  |  |  | Size (d · nm) | % Intensity | St. Dev. (d · nm) |
|---|---|---|---|---|---|
| Z-average (d · nm) | 337.3 | Peak 1: | 288.2 | 100.0 | 101.2 |
| PdI | 0.400 | Peak 2: | 0.000 | 0.0 | 0.000 |
| Intercept | 0.915 | Peak 3: | 0.000 | 0.0 | 0.000 |

Figure 2A:
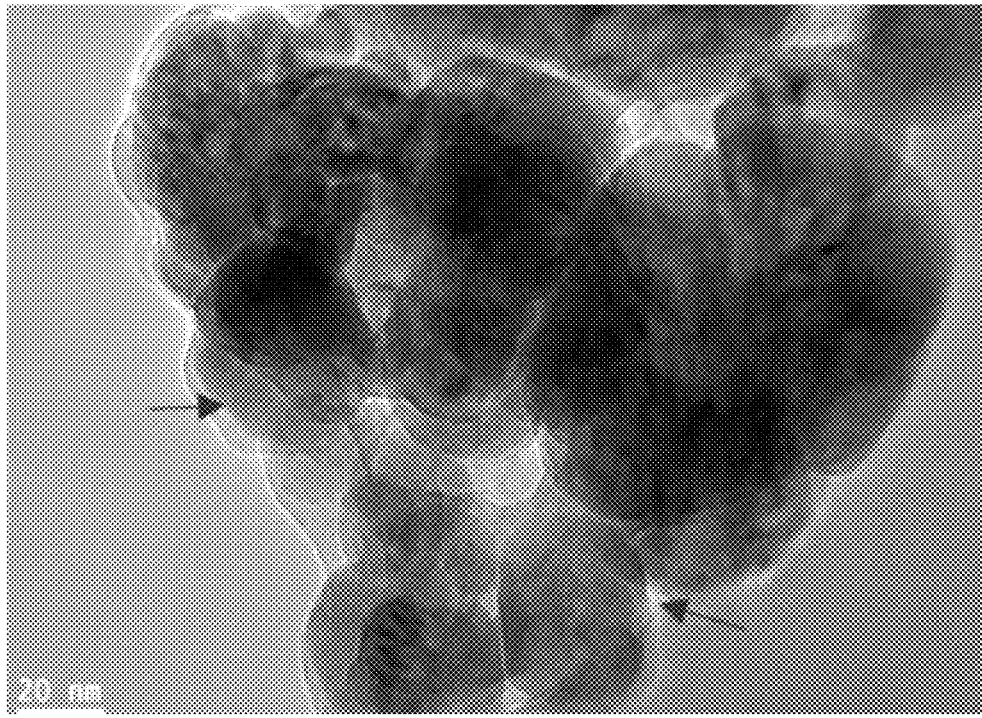
FIGS. 2A, 2B, and 2C each depict transmission electron micrographs of the ZnO nano-photocatalyst.
Figure 2B:
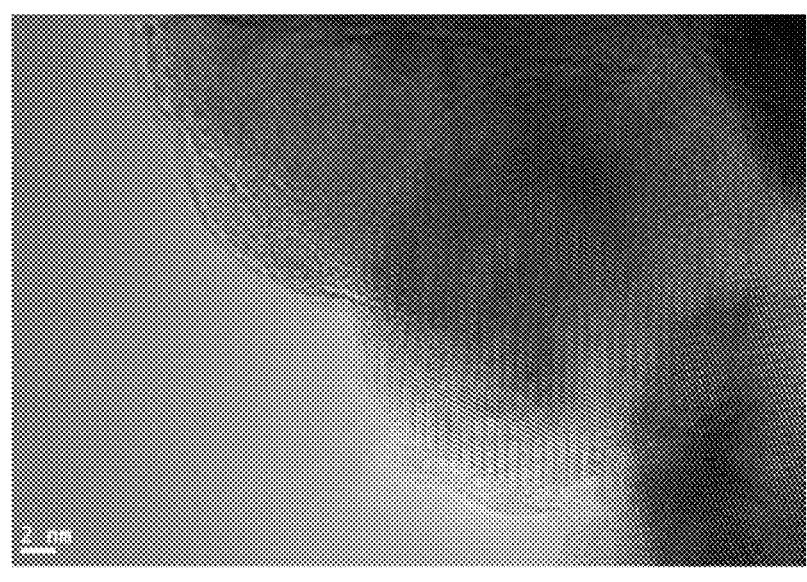
Figure 2C:
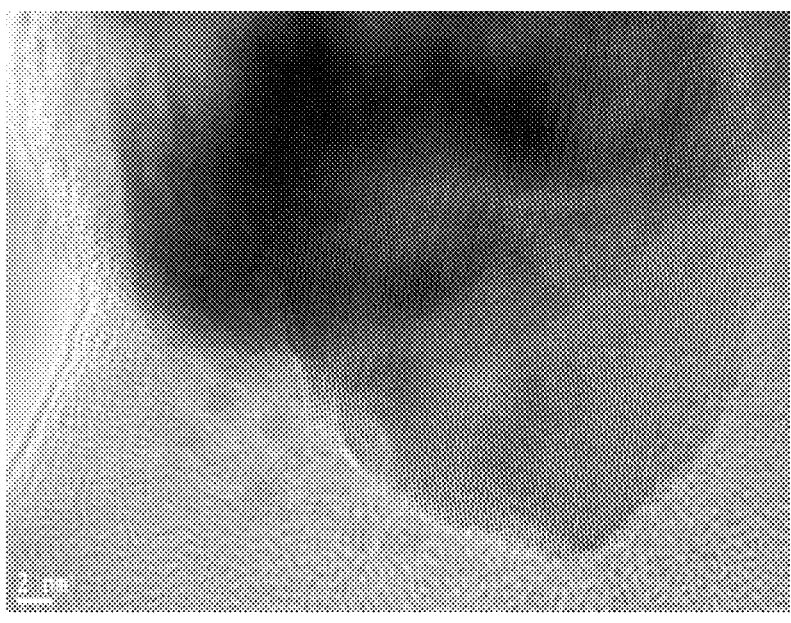

The morphology and topography of the zinc oxide nanoparticles was characterized using transmission electron microscopy (TEM) and it can be observed that the obtained ZnO nanoparticles included nanoparticles shaped as spheres, rectangles, irregular, and hexagonal-shaped particles. (See FIGS. 2A, 2B, and 2C)

Figure 3:
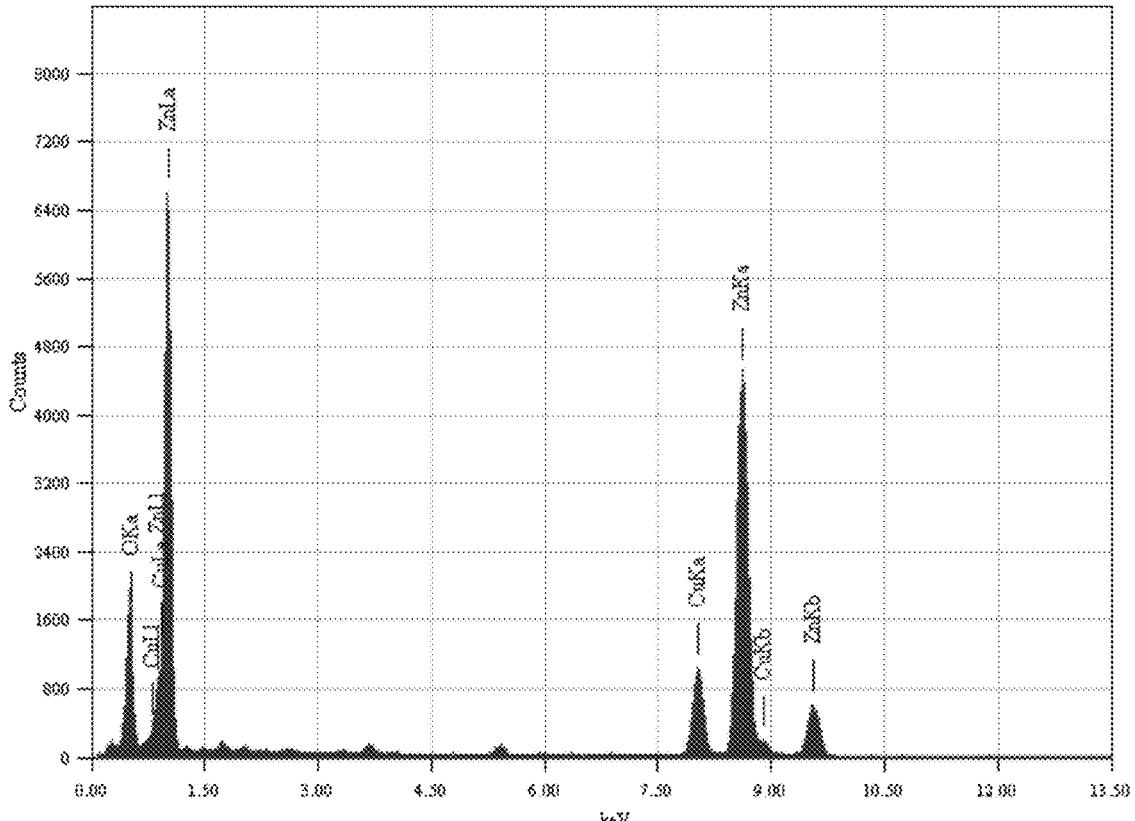
FIG. 3 depicts the energy dispersive X-ray spectrum of the ZnO nano-photocatalyst.

The elemental composition of ZnO nanoparticles was examined using an energy dispersive X-ray spectrometer (EDX). The resulting EDX spectrum shows three peaks which were identified as zinc and one peak oxygen. (See FIG. 3) The EDX analysis displays the optical absorption peaks of ZnO nanoparticles, and these absorption peaks were due to the surface plasmon resonance of Zinc oxide nanoparticles.

Figure 4:
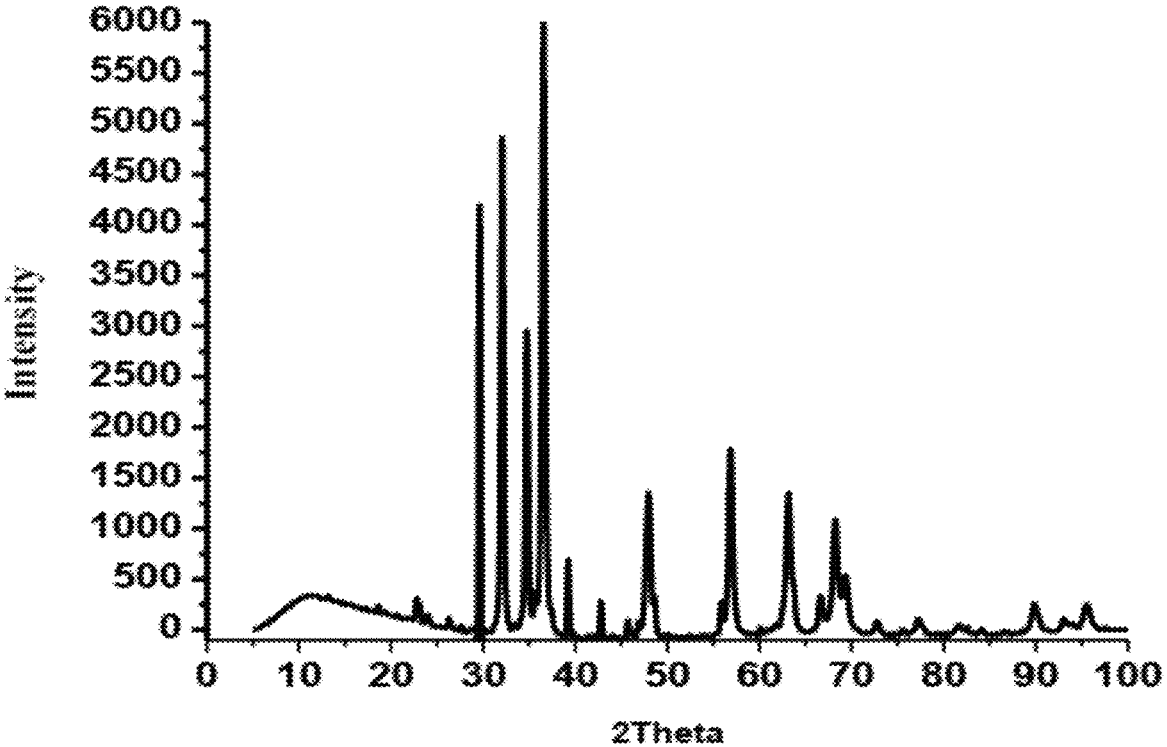
FIG. 4 depicts a graph illustrating an X-ray diffraction analysis of the ZnO nano-photocatalyst.

X-ray diffraction (XRD) analysis was used to analyze the crystalline phase of the synthesized ZnONPs and after being characterized for the crystal structure based on the diffraction patterns as shown. (See FIG. 4)

Figure 5:
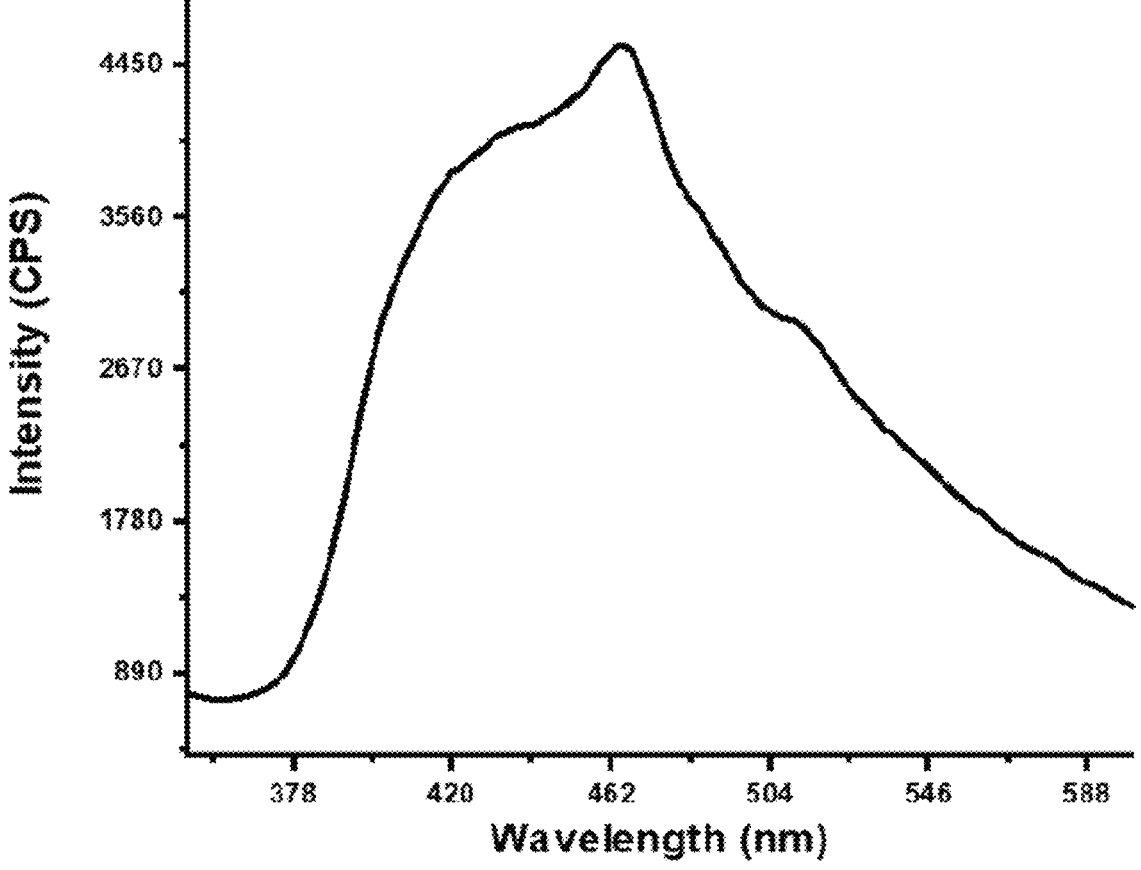
FIG. 5 depicts a graph illustrating the photoluminescence emission spectrum of the ZnO nano-photocatalyst.

The photoluminescence spectrum of synthesized ZnO NPs recorded with the excited wavelength of 330 nm are shown in FIG. 5. The strong PL emissions are observed for ZnO NPs at 462 nm.

Example 3

Photocatalytic Activity of the Nano-Photocatalyst

Photocatalytic activity was evaluated under UV irradiation using methylene blue and crystal violet dyes. About 20 mL of each dye solution was placed in a laboratory-scale cuvette and the photocatalyst sample (2 mg of nanoparticles powder) was dispersed inside each cuvette facing UV light at a distance of 5 cm from the UV-light source, with continuous stirring during the degradation test. Optical absorption spectra were determined upon different light exposure durations using a UV/Vis spectrophotometer in order to monitor the rate of degradation by recording the reduction in absorption intensity of dye at the maximum wavelength ($\lambda$max=672 nm) for blue methylene (MB dye) and 593 nm for crystal violet (CV dye). The degradation efficiency (DE) was calculated as in equation: DE %=($A_o$−A)/$A_o$×100 where $A_0$ is the initial absorption and A is the absorption intensity after photodegradation.

Figure 6A:
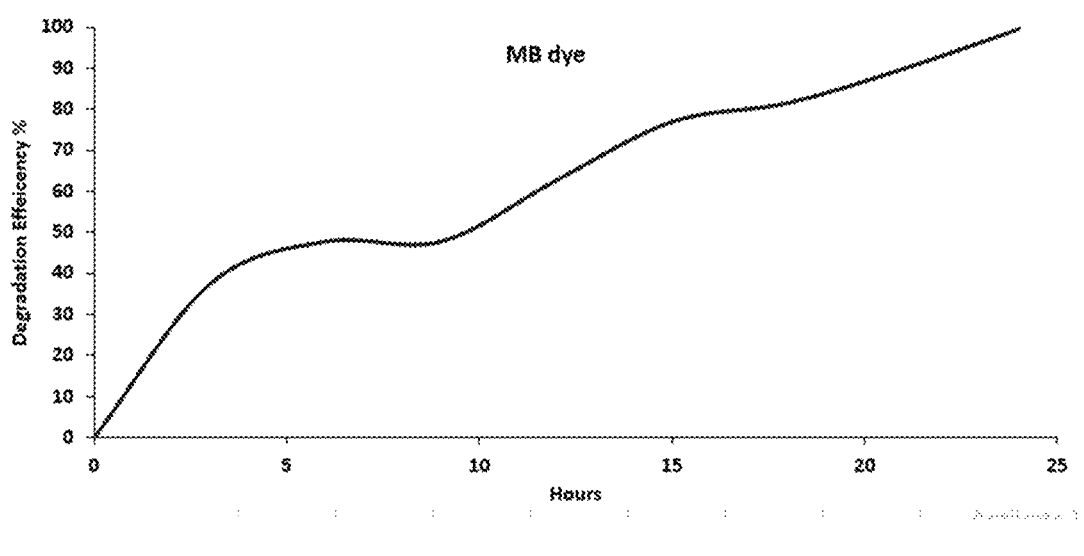
FIG. 6A depicts a graph of the degradation efficiency of the ZnO nano-photocatalyst on methylene blue dye.
Figure 6B:
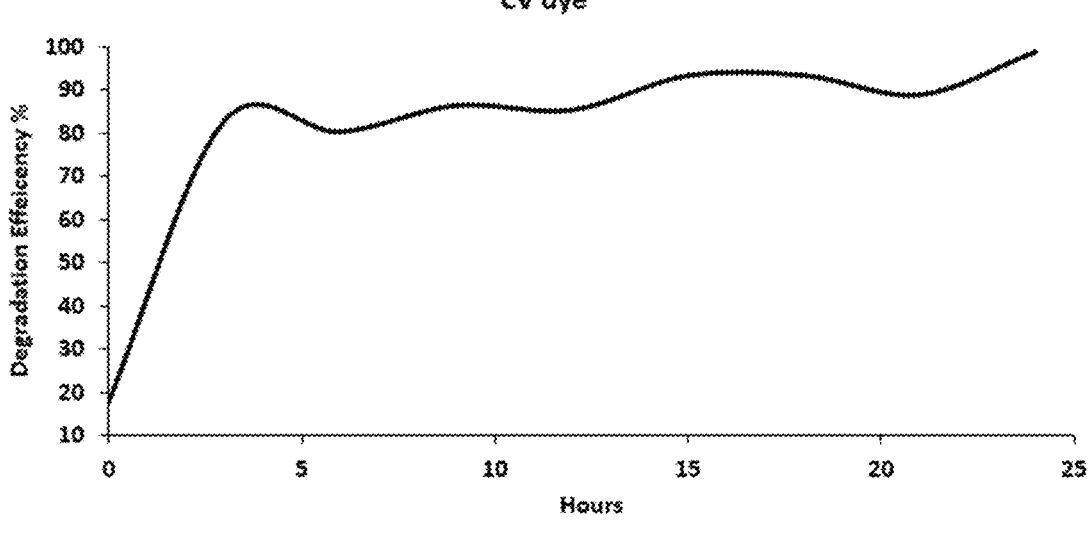
FIG. 6B depicts a graph of the degradation efficiency of the ZnO nano-photocatalyst on crystal violet dye.
Figure 6C:
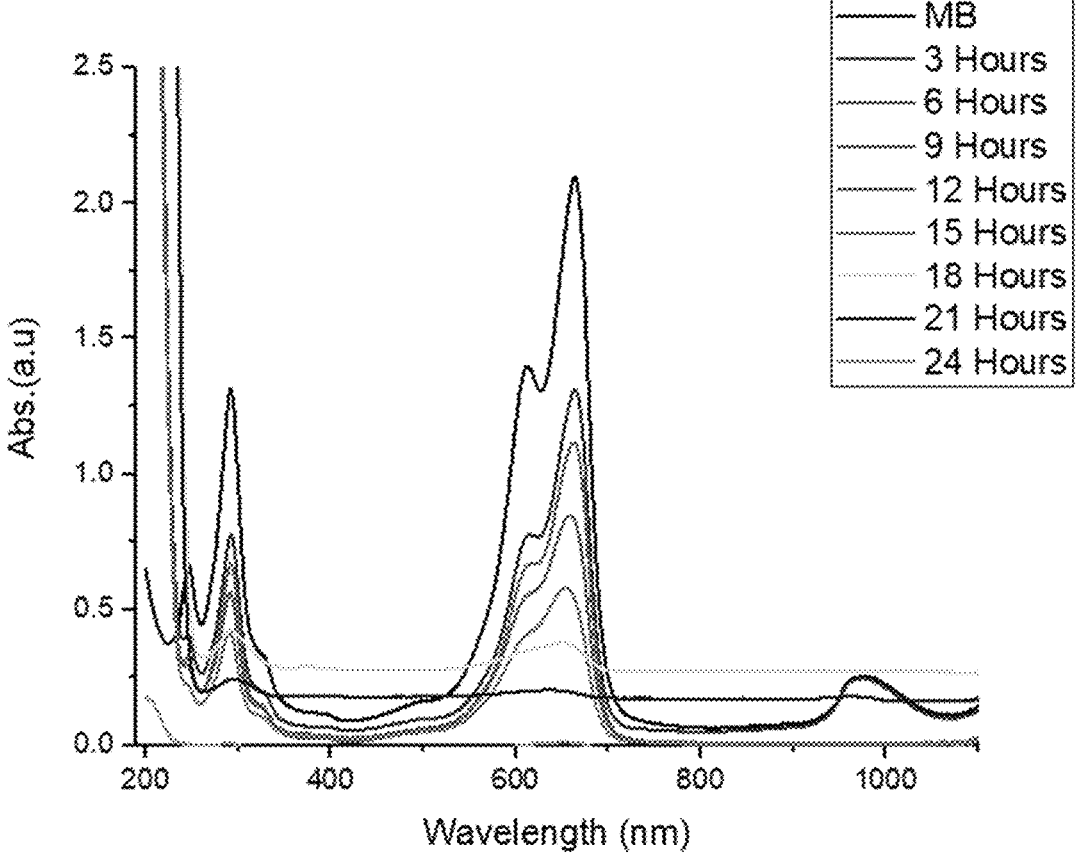
FIG. 6C depicts the absorbance at various wavelengths detected over time when the ZnO nano-photocatalyst is incubated with methylene blue dye.
Figure 6D:
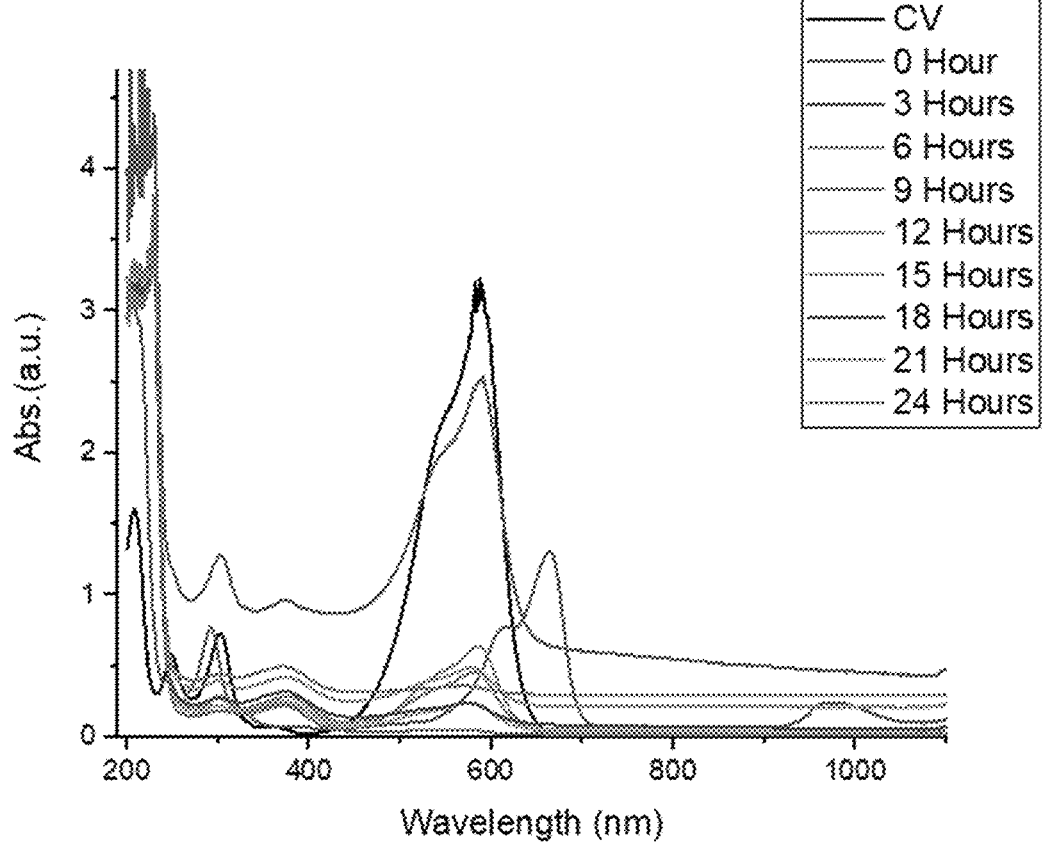
FIG. 6D depicts the absorbance at various wavelengths detected over time when the ZnO nano-photocatalyst is incubated with crystal violet dye.

The obtained results show that the green treated ZnO nanoparticles can act as an excellent photocatalytic material to degrade dyes and other organic compounds in wastewater. (See FIGS. 6A, 6B, 6D, and 6D)

In the case of MB dye, the dye was almost completely degraded 99.7% after 24 hours under UV irradiation under visible irradiation, while CV dye degraded 98.8% after 24 hours under UV irradiation and visible irradiation. Overall, ZnONPs exhibit high potential in the development of catalytic material for photocatalytic degradation of hazardous dyes or chemicals, hence paving the way for the treatment and bioremediation.

Example 4

Evaluation of Sewage Water Purified Using the Nano-Photocatalyst

Wheat (*Triticum aestivum*) and barley (*Hordeum vulgare*) seeds were obtained from the College of Agriculture at King Saud University.

The wheat and barley seeds were sterilized for five minutes using 5% (w/v) sodium hypochlorite, then rinsed and soaked in distilled water for a day. The seeds were then divided into three groups and placed in Petri dishes. The treatments were divided into three groups: 1) a group irrigated with sewage water treated with nanoparticles produced according to Example 1 above; 2) a group irrigated with sewage water treated with chlorine (chlorinated effluent); and 3) a group irrigated with tap water (control). The contents of the tap water were assessed and are reported in Table 2. The contents of the sewage water purified with ZnONPs were also assessed and are reported in Table 3.

TABLE 2

Report of Chemical Analysis of Irrigation Water

| Analysis | Units | Operating Parameters | Results |
|---|---|---|---|
| Temperature | ° C. | — | 24 |
| pH | — | 7.0-9.2 | 6.8 |
| Conductivity at 20° C. | Micromhos/cm | 4000 max | 1407 |
| Total Dissolved Solids | mg/1 | 2600 max | 983 |
| P - Alkalinity | mg/1 $CaCO_2$ | - NA - | Nill |
| M - Alkalinity | mg/1 $CaCO_2$ | 400 max | 104 |
| Organic Substance | mg/L | 10 max | — |
| Total Hardness | mg/1 $CaCO_2$ | 1300 max | 332 |
| Calcium Hardness | mg/1 $CaCO_2$ | — | 172 |
| Magnesium Hardness | mg/1 $CaCO_2$ | — | 160 |
| Suspended Solids | mg/1 | 15 max | 1 |
| Residual Clorine | mg/1 $ClCl_2$ | 1.0-1.5 irrigation | 1.50 |
| Chloride | mg/L NaCl | 1300 max | 480 |
| B.O.D. Inlet | mg/1 | | 61 |
| B.O.D. Outlet | mg/1 | | 5-9 |

TABLE 3

Evaluation of Sewage Treated with ZnONPs

| Compound | Unit | ZnONPs |
|---|---|---|
| AGGREGATE ORGANIC PARAMETERS | | |
| Biochemical Oxygen Demand | mg/L | <2 |
| Chemical Oxygen Demand | mg/L | 11.8 |
| Total Organic Carbon | mg/L | 2.8 |
| INORGANIC NONMETALLIC PARAMETERS | | |
| Chloride | mg/L | 368 |
| Chlorine Residual | mg/L | <0.20 |
| MAJOR CATIONS & ANIONS | | |
| ^ M-Alkalinity as $CaCO_3$ | mg/L | 42 |
| ^ P-Alkalinity as $CaCO_3$ | mg/L | <1 |

TABLE 3-continued

| Evaluation of Sewage Treated with ZnONPs | | |
|---|---|---|
| Compound | Unit | ZnONPs |
| PHYSICAL PARAMETERS | | |
| ^ Calcium Hardness as CaCO₃ | mg/L | 192 |
| Electrical Conductivity @ 25° C. | µS/cm | 1700 |
| ^ Magnesium Hardness as CaCO₃ | mg/L | 96.8 |
| Temperature | ° C. | 222 |
| Total Dissolved Solids @ 180° C. | mg/L | 1090 |
| ^ Total Hardness as CaCO₃ | mg/L | 288 |
| Total Suspended Solids | mg/L | <5 |
| pH Value | pH Unit | 6.78 |

The seeds were transferred to containers once the roots had reached an appropriate length for irrigation, and irrigated with the water samples under study, depending on the treatment. The plants were grown for three weeks and measurements of seed germination, shoot length, and total root length were taken at 7, 14, and 21 days.

The data in this study were statistically analyzed using one-way analysis of variance (ANOVA) in SPSS version 26 software, with p-values<0.05 considered as significant. Means and standard deviations were determined by measurements performed on three replicates for each treatment and control.

Figure 7A:
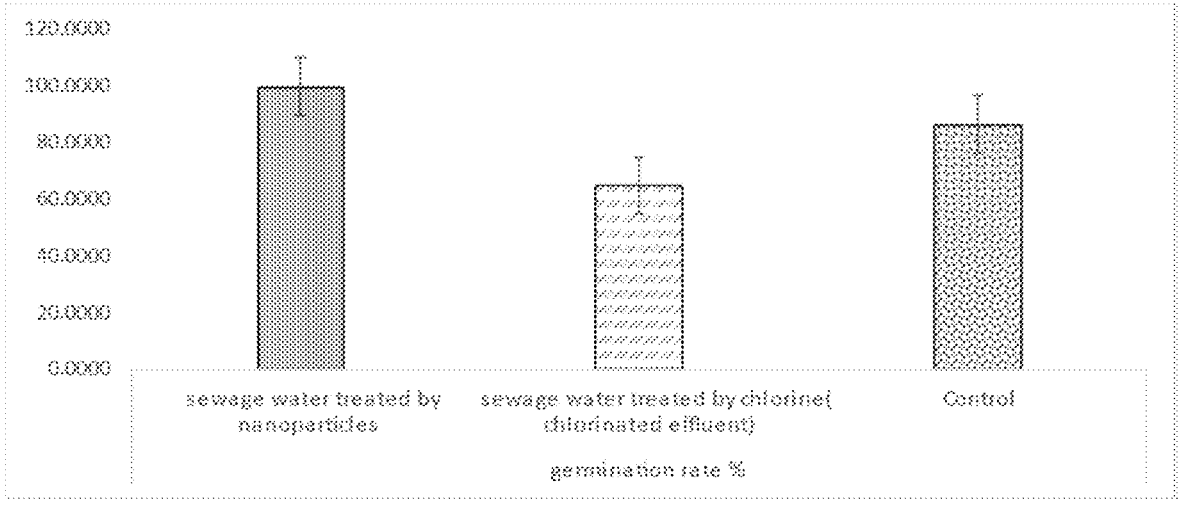
FIGS. 7A-7B depict charts showing the effect on germination rate and root and shoot length for all treatments studied upon *Triticum aestivum* seedlings after 21 days, with FIG. 7A depicting Final Germination Percentage and FIG. 7B depicting Root Length and Shoot Length.
Figure 7B:
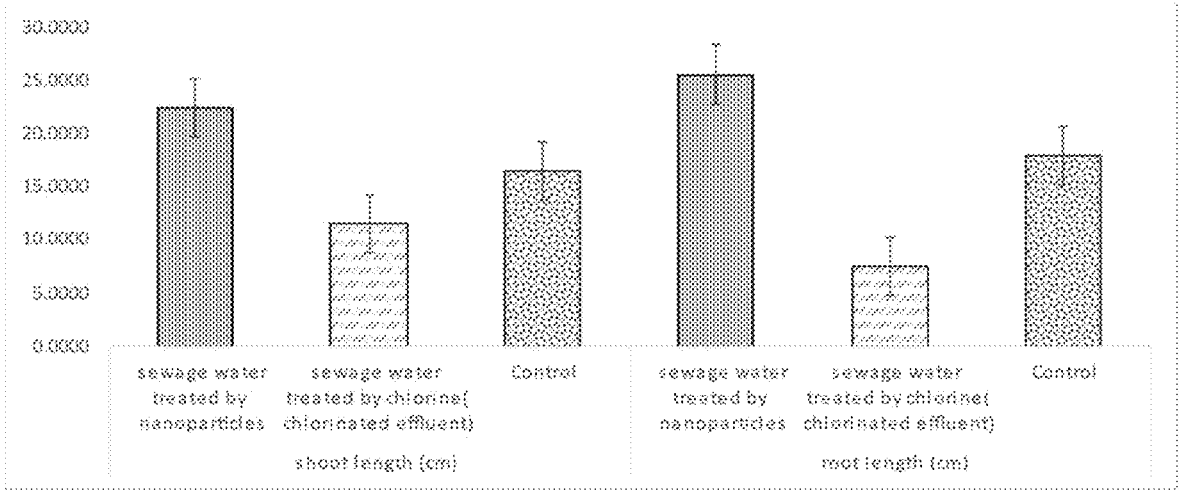
Figure 8A:
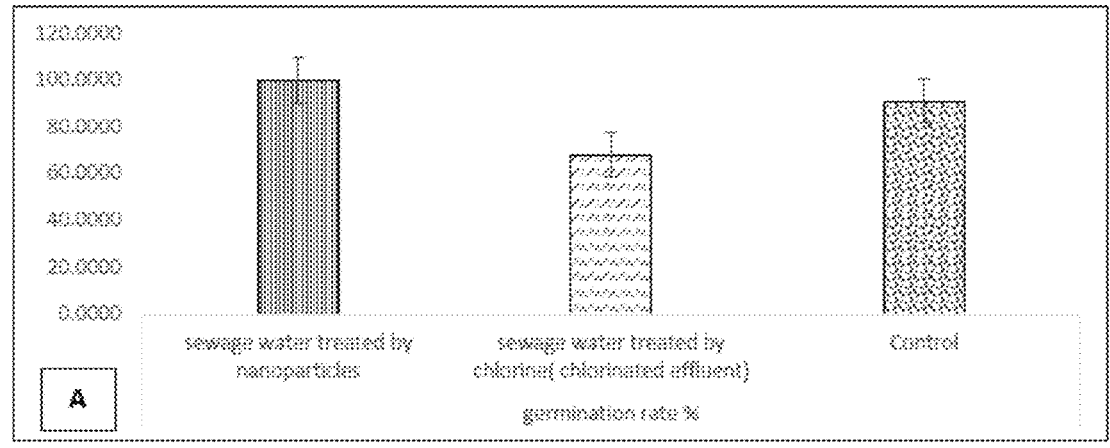
FIGS. 8A-8B depict charts showing the effect on germination rate and root and shoot length for all treatments studied upon *Hordeum vulgare* seedlings after 21 days, with FIG. 7A depicting Final Germination Percentage and FIG. 7B depicting Root Length and Shoot Length.
Figure 8B:
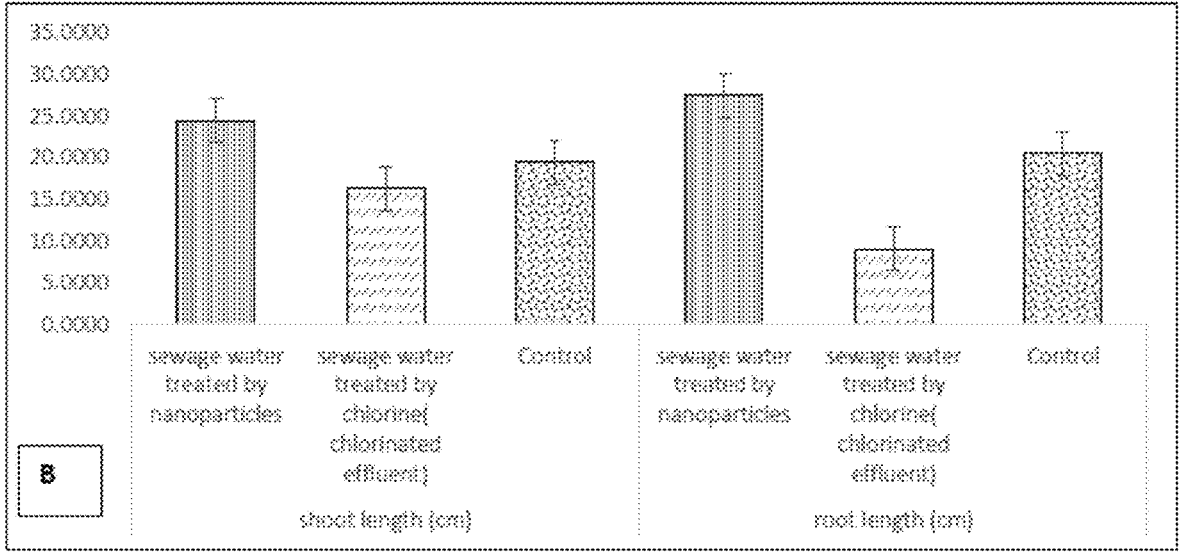

In our study, we utilized three different methods of treatment (tap water as control, sewage water treated with The results showed a significant improvement in root and shoot length in both species irrigated by nanoparticle-treated wastewater compared to the control. These results are detailed in Table 4 and FIGS. 7A-7B for wheat, and Table 4 and FIGS. 8A-8B for barley.

In the control, a shoot length ranging from 2.40 cm to 16.50 cm was recorded after 21 days for wheat, while the shoot length of wheat irrigated with nanoparticle-treated wastewater improved significantly after only 7 days and ranged from 3.83 cm to 22.53 cm after 21 days, which was almost twice the length of the shoots of the wheat irrigated with chlorinated wastewater. Moreover, the sewage water treated with nanoparticles had the highest root length, at 25.63 cm, while the lowest wheat root length occurred in the wastewater treated with chlorine, at no more than 7.60 cm.

The barley under nanoparticle-treated wastewater irrigation also showed a noticeable improvement in all indicators under study, with shoot lengths of 4.73, 14.53, and 24.46 cm after 7, 14, and 21 days, respectively. Barley shoot length was lower in the control, at 3.40, 11.06, and 19.50 cm, and lowest under chlorine-treated sewage water irrigation, at 1.93, 6.53, and 16.4 cm in the three respective study periods.

Barley root length was highest after 21 days in the nanoparticle-treated sewage water, at 27.53 cm, while it had the lowest root length in sewage water treated with chlorine (9.13 cm), which rose to 20.50 cm after 21 days.

TABLE 4

| | | Effect of Sewage Water Treated with Nanoparticles on Seed Germination and Seedling Stages of Triticum aestivum and Hordeum vulgare | | | | | | |
|---|---|---|---|---|---|---|---|---|
| | | FGP (Final Germination Percentage) | Shoot length (cm) mean ± SE | | | Root Length (cm) mean ± SE | | |
| Plant | Sewage Water Treatments | mean ± SE | 7 days | 14 days | 21 days | 7 days | 14 days | 21 days |
| Triticum aestivum L. | NP Treated | 100.00 ± 0.00 | 3.83 ± 0.033 | 10.70 ± 0.115 | 22.53 ± 0.14530 | 3.46 ± 0.08819 | 15.56 ± 0.145 | 25.63 ± 0.14530 |
| | Chlorine | 65.00 ± 0.577 | 1.50 ± 0.057 | 4.10 ± 0.115 | 11.60 ± 0.17321 | 1.06 ± 0.08819 | 5.13 ± 0.12019 | 7.60 ± 0.15275 |
| | Control | 89.00 ± 0.577 | 2.40 ± 0.057 | 7.56 ± 0.088 | 16.50 ± 0.15275 | 2.40 ± 0.05774 | 9.63 ± 0.08819 | 18.00 ± 0.26458 |
| Hordeum vulgare | NP Treated | 100.00 ± 0.00000 | 4.73 ± 0.12019 | 14.5333 ± 0.17638 | 24.4667 ± 0.18559 | 3.76 ± 0.08819 | 16.5333 ± 0.17638 | 27.5333 ± 0.23333 |
| | Chlorine | 68.00 ± 0.57735 | 1.93 ± 0.08819 | 6.5333 ± 0.14530 | 16.4000 ± 0.15275 | 0.80 ± 0.05774 | 6.3000 ± 0.05774 | 9.1333 ± 0.28480 |
| | Control | 91.00 ± 0.57735 | 3.40 ± 0.05774 | 11.0667 ± 0.24037 | 19.5000 ± 0.05774 | 2.06 ± 0.08819 | 11.5333 ± 0.17638 | 20.5667 ± 0.17638 | nanoparticles, and sewage water treated with chlorine (chlorinated effluent)). The results are presented in Table 4 and FIGS. 7A, 7B, 8A, and 8B.

In general, the sewage water treated with nanoparticles showed a clear improvement in all the indicators under study. This treatment was often superior to the control treatment for both study species. The detailed results are described below.

The average number of seeds that germinate after one week is known as the final germination percentage (FGP). There was significant variance between the control group and nanoparticle-treated sewage water group. The latter achieved a germination rate of 100%, versus 89% in the control.

On the other hand, the FGP of the chlorine-treated sewage water was recorded as the lowest value in both species, at 65% and 68% for wheat and barley, respectively.

It is to be understood that the synthesis of a nanophotocatalyst for sewage water treatment is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of producing a ZnO nano-photocatalyst comprising:

providing an aqueous extract comprising pigeon droppings;

filtering the aqueous extract to produce a filtrate;

mixing zinc nitrate with the filtrate to obtain a paste; and calcining the paste to produce the ZnO nano-photocatalyst.

2. The method of claim 1, wherein the filtering comprises:

filtering the aqueous extract through gauze to produce a first filtrate; and filtering the first filtrate through filter paper to produce a second filtrate.

3. The method of claim 1, comprising:

suspending about 20 g of pigeon droppings in about 100 mL of water to provide the pigeon droppings aqueous extract.

4. The method of claim 1, comprising mixing about 2 g of the zinc nitrate with about 100 mL of the filtrate to obtain the paste; wherein the zinc nitrate comprises zinc nitrate hexahydrate.

5. The method of claim 4, comprising mixing the zinc nitrate hexahydrate and the filtrate under constant stirring at about 60° C.

6. The method of claim 1, comprising calcining the paste in a muffle furnace at about 400° C. for about 4 hours to produce the ZnO nano-photocatalyst.

7. A method of treating sewage, comprising:

providing an aqueous extract comprising pigeon droppings;

filtering the aqueous extract to produce a filtrate;

mixing zinc nitrate with the filtrate to obtain a paste;

calcining the paste to obtain a ZnO nano-photocatalyst; and applying the ZnO nano-photocatalyst to the sewage;

wherein the ZnO nano-photocatalyst catalyzes degradation of at least one organic compound in the sewage.

8. The method of treating sewage of claim 7, wherein the filtering comprises:

filtering the aqueous extract through gauze to produce a first filtrate; and filtering the first filtrate through filter paper to produce a second filtrate.

9. The method of treating sewage of claim 7, comprising:

suspending about 20 g of pigeon droppings in about 100 mL of water to provide the pigeon droppings aqueous extract.

10. The method of treating sewage of claim 7, comprising mixing about 2 g of the zinc nitrate with about 100 mL of the filtrate to obtain the paste; wherein the zinc nitrate comprises zinc nitrate hexahydrate.

11. The method of treating sewage of claim 10, comprising mixing the zinc nitrate hexahydrate and the filtrate under constant stirring at about 60° C.

12. The method of treating sewage of claim 7, comprising calcining the paste in a muffle furnace at about 400° C. for about 4 hours to obtain the ZnO nano-photocatalyst.

* * * * *